United States Patent [19]

Richards et al.

[11] 4,345,916

[45] Aug. 24, 1982

[54] MEANS AND METHOD FOR REMOVING AIRBORNE PARTICULATES FROM AN AEROSOL STREAM

[76] Inventors: Clyde N. Richards, 4667 Ocean Blvd., #306, San Diego, Calif. 92019; Marx Brook, 1216 North Dr., Socorro, N. Mex. 87801

[21] Appl. No.: 151,352

[22] Filed: May 19, 1980

[51] Int. Cl.$^3$ .................. B03C 3/01; B01D 37/00; B01D 47/00; B01D 51/04

[52] U.S. Cl. .................................. 55/5; 55/10; 55/11; 55/83; 55/94; 55/107; 55/122; 55/135; 55/223; 55/262; 55/263; 261/17; 261/115; 261/DIG. 9; 261/DIG. 54; 261/DIG. 76

[58] Field of Search .................. 55/5, 7–11, 55/83, 94, 107, 122, 135, 223, 226, 262–263; 261/DIG. 76, 17, 115, DIG. 9, DIG. 54

[56] References Cited

U.S. PATENT DOCUMENTS

| | | | |
|---|---|---|---|
| 2,579,282 | 12/1951 | Vicard | 55/94 X |
| 2,604,185 | 7/1952 | Johnstone et al. | 261/DIG. 54 X |
| 3,773,472 | 11/1973 | Hausberg et al. | 423/242 A X |
| 3,906,078 | 9/1975 | Hausberg et al. | 423/242 A |
| 3,958,959 | 5/1976 | Cohen et al. | 55/10 |
| 3,960,505 | 6/1976 | Marks | 55/10 X |
| 4,095,962 | 6/1978 | Richards | 55/10 |

FOREIGN PATENT DOCUMENTS 492292  3/1976  U.S.S.R. .................. 55/223

*Primary Examiner*—Kathleen J. Prunner
*Attorney, Agent, or Firm*—Bruno J. Verbeck; Michael L. Slonecker

[57] ABSTRACT

Disclosed herein is a method for removing airborne particulates from an aerosol stream by first humidifying said aerosol with steam, and then cooling said aerosol with water to saturation temperature. Thereafter, the saturated aerosol is adiabatically cooled to a supersaturated state and maintained at supersaturation for a time sufficient to permit the growth and removal thereof of said particulates. Further disclosed is an apparatus adapted for practicing the method of the present invention and employing charged droplet scrubbing techniques to remove said particulates.

18 Claims, 3 Drawing Figures

MEANS AND METHOD FOR REMOVING AIRBORNE PARTICULATES FROM AN AEROSOL STREAM

BACKGROUND OF THE INVENTION

1. Field of the Invention

The present invention relates to a means and method for removing airborne particulates from an aerosol, and more particularly to unique and simplified means and method for enhancing the growth of said particulates whereby to efficiently and economically remove same utilizing charged droplet scrubbing techniques.

2. Brief Description of the Prior Art

It is known in the art to use an electric field to sweep highly charged droplets, i.e.—charged within a factor of their maximum theoretical limit, across an aerosol whereby to cause the charged droplets to collect ariborne particulates and remove same from the aerosol, so-called electrostatic scrubbing. As taught by Richards, U.S. Pat. No. 4,095,962, particulate collection efficiency may be enhanced if the airborne particulate has been charged, prior to electrostatic scrubbing, with a polarity opposite that of the highly charged droplets. Most small particulates, in the order of 5 microns or less, which typically escape from conventional electrostatic precipitators will thus carry a small net opposite charge whereby to obtain coulomb-enhanced coalescence of the particulates and the droplets.

However, practical difficulties in charging small particles, particularly those particles having a high resistivity, taken together with the increased complexity of the apparatus if an initial charge is to be imparted to the particulates, detracts somewhat from the adaptability of Richards for scrubbing airborne particulates emitted by certain industrial processes.

Present attempts to evolve improved scrubbers having enhanced collection efficiencies for removing small particulates have been primarily directed towards the development of flux force condensation (FF/C) scrubbers. Briefly, these scrubbers employ the effects of thermophoresis, diffusiophoresis, and condensation to effect particle growth and move said particles towards a wetted surface. The prior art recognizes that particle enlargement due to water vapor condensation thereon enhances inertial impaction of the particles. However, the prior art has hitherto assumed that if a critical saturation ratio, which is a function of particle size and wettability and solubility in water, is achieved, spontaneous nucleation, condensation, and particle growth can be obtained. This assumption is based upon "cloud formation" theory wherein the particle loading number density per unit of air is quantitatively much smaller than the particle loading number density typically encountered in aerosols discharged from various industrial processes.

With regard to condensation as a means for effecting particulate growth, it is known in the art to saturate a gas stream, having a temperature above 212° F., with a fine mist spray of water. The saturated gas stream is adiabatically cooled whereby water is precipitated upon airborne particles carried in the gas stream, and then conventional cyclone separators are utilized to remove said particles. C. H. Hausberg, et al., U.S. Pat. Nos. 3,773,472 and 3,906,078. The drawbacks associated with such a method are substantial. By using water as the sole means for saturating the gas stream, and then allowing for a residence time sufficient to establish an equilibrium temperature, some water will evaporate into the gas stream thereby cooling it. As a result the amount of water vapor that can be carried by the stream is limited and significant pressure drops within a treatment system are required downstream of the saturation step in order to condense from said gas stream the quantity of water necessary to grow the particulate to a size sufficient for removal. A still further drawback resides in the fact that saturation and subsequent cooling of the aerosol alone is inadequate to stimulate the growth of submicron particulates and, therefore, these particulates generally avoid being collected.

In view of the hereinbefore described limitations present in the prior art, it is an object of the present invention to provide a method for economically and efficiently removing airborne particulates from an aerosol.

A still further object of the present invention is to provide a method for enhancing submicron particulate growth to a size sufficient for facilitating the removal thereof from an aerosol.

Yet another object is to provide a method for scrubbing aerosols adaptable over a wide range of particulate loading densities within the aerosol.

Another object is to provide a method particularly adapted for removing particulates from aerosols with minimum system energy losses.

A still further object is to provide a method for enhancing particulate growth to a size sufficient for removal by electrostatic scrubbing techniques.

And yet another object is to provide a new and unique apparatus useful in scrubbing particulates from an aerosol.

These and other objects of the present invention will be readily appreciated by reference to the following description of the present invention taken in conjunction with the accompanying drawings.

SUMMARY OF THE INVENTION

The present invention relates to a unique means and method for removing airborne particulates from an aerosol stream, and more particularly to a means and method for supersaturating, and maintaining at said supersaturated condition, an aerosol stream during scrubbing. In practicing the method of the present invention, finely divided particulates, in the order of about 0.05 microns diameter and larger, serve as condensation nuclei for water vapor, and the particulates are permitted to grow to a size of about 1.0 to 5.0 microns diameter whereby the particulates can be efficiently and economically removed utilizing conventional scrubbing techniques such as, for example, electrostatic scrubbing.

The method of the present invention recognizes that the saturation of an aerosol stream with water vapor predominantly is a function of aerosol temperature. That is to say that a higher aerosol temperature permits correspondingly higher mixing ratios of water vapor to aerosol. In certain industrial processes, for which the present invention is particularly adaptable, aerosol temperatures of about 300° to 900° F. are typically encountered. Furthermore, the present invention recognizes that at such elevated temperatures and mixing ratios, condensation of discrete quantities of water vapor necessary for particulate growth can be obtained with only minimal reduction of the aerosol temperature.

To advantageously exploit the aforementioned aerosol properties, the method of the present invention comprises initial humidification of an untreated aerosol stream with sufficient water vapor to obtain an unsaturated aerosol stream at a prescribed mixing ratio. Steam, versus water spray, is preferably employed to humidify the aerosol inasmuch as steam may be added directly to the aerosol without significant cooling effects, cooling which would otherwise limit the capacity of the aerosol to carry water vapor.

The unsaturated aerosol stream is cooled to saturation temperature by passing said aerosol through a water mist spray. Cooling only to saturation at this step of the method is important to prevent premature condensation of water vapor, condensation which would otherwise reduce the quantity of water vapor available for facilitating growth of the smaller, i.e.—submicron, airborne particles.

The aerosol stream is then adiabatically cooled to a supersaturated condition and maintained at supersaturation during scrubbing. Briefly, supersaturation of the aerosol is obtained by passing said saturated aerosol through a section of converging duct. Bernoulli's equation teaches that as aerosol velocity increases pressure decreases, and the second law of thermodynamics teaches that temperature decreases in response to a pressure decrease if no heat is added to the aerosol stream.

Finally, conventional highly charged droplet scrubbing techniques are utilized to collect and remove the airborne particulates. Maintenance of the supersaturated condition during scrubbing occurs under the influence of sensible heat exchange between the aerosol stream and the highly charged droplets utilized to collect and remove the airborne particulates.

DESCRIPTION OF THE PREFERRED EMBODIMENT

Figure 1:
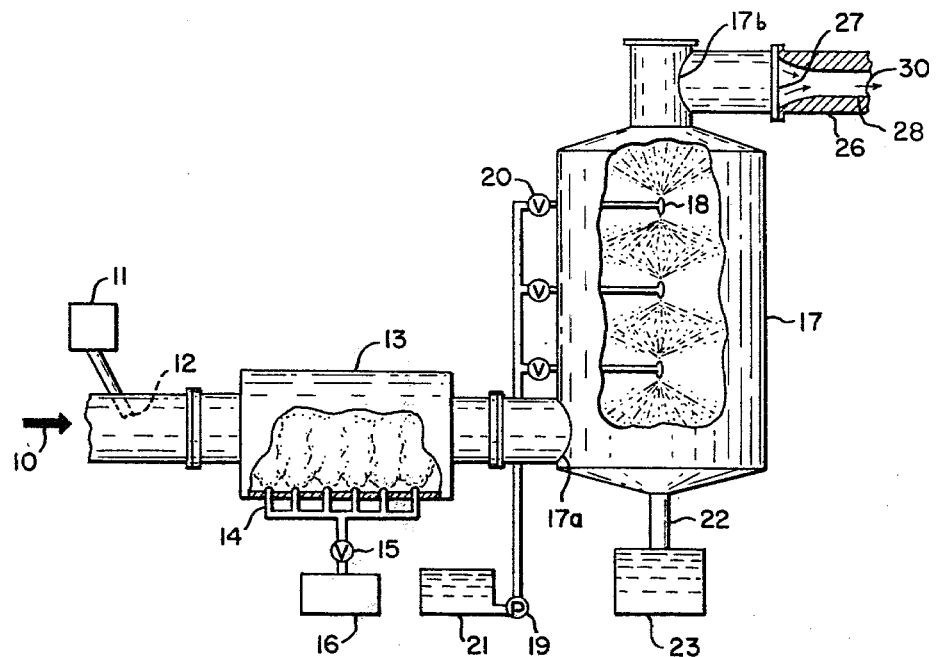
FIG. 1 is a partial, broken-away view of an apparatus adapted to supersaturate an aerosol stream in accordance with the method of the present invention.

Refering to FIG. 1, reference numeral 10 denotes an untreated aerosol stream containing various airborne particulates admixed therewith. For example, aerosol from a coal burning combustion source typically comprises approximately 80% nitrogen, 10% carbon dioxide, 10% water vapor, and minor amounts of carbon monoxide, $NO_x$ and $SO_x$. Also carried by the aerosol is particulate matter, in the form of "fly ash," composed primarily of various non-combustible silicates found in coal. While untreated aerosol temperatures are site specific, aerosol stream 10 typically has a temperature of about 300° to 900° F., and a pressure of about 1.005 atm. abs.

Due, in part, to the adverse environmental effects of discharging the $NO_x$ and $SO_x$ components of said aerosol into the atmosphere, it is considered preferable to neutralize said components during the treatment process. Accordingly, the integrated method of the present invention preferably includes the preliminary step of admixing $NO_x$ and $SO_x$ conditioning particles with the aerosol, substantially in the manner as taught by Hausberg et al., U.S. Pat. No. 3,906,078, incorporated by reference herein. In the preferred embodiment of the present invention shown in FIG. 1, means for admixing said conditioning particles is diagramatically represented by reference numeral 11, means 11 having an outlet 12 therefrom interposed into the aerosol stream 10 through which the delivery of conditioning particles may be facilitated.

Means for humidifying the aerosol stream are next provided and comprise a humidification vessel 13 having a plurality of nozzles 14, directed into the interior thereof, communicating through valve 15 with a steam source 16. As the aerosol stream is received into the interior of vessel 13, predetermined quantities of steam are released by nozzles 14 and entrained into the aerosol stream whereby to obtain an unsaturated aerosol having a predetermined mixing ratio, by weight, of water vapor to aerosol.

The humidified aerosol stream is next received within a conventional wash tower 17 for cooling said aerosol to saturation temperature. Briefly, wash tower 17 has an aerosol receiving inlet 17a proximate the base thereof and an outlet 17b at the top. Wash spray liquid, preferably water, for cooling the humidified aerosol is admixed with said aerosol by means of a plurality of axially aligned, spaced apart nozzles 18 interposed within the interior of tower 17. A pump 19 and valves 20 are further included for delivering said liquid from reservoir 21 to nozzles 18. Cooling of the aerosol to saturation temperature is typically performed by a fine conical spray of wash liquid from nozzles 18, the quantity and temperature of the wash liquid being determined by the aerosol temperature reduction necessary to saturate said aerosol.

As the wash spray settles through the aerosol stream, certain of the airborne particulates are collected by the spray and exit tower 17 through a drain 22 into reservoir 23. Liquid collected in reservoir 23 may subsequently be withdrawn therefrom and appropriately treated or filtered for recycle back to reservoir 21. In practice, some of the wash spray will evaporate within tower 17 and become entrained into the aerosol; therefore, the flow of steam into vessel 13 will be reduced accordingly whereby the saturated aerosol stream at outlet 17b will be at the predetermined mixing ratio.

Means for supersaturating the saturated aerosol are next included, and comprise a section of converging duct 26 having an inlet 27 and a throat 28. The design criteria for duct 26 requires that the cooling of the aerosol stream therein is sufficient to maintain a saturation ratio of at least 1.02, and that each airborne particle has a residence time within that saturation ratio for at least 0.1 seconds. The design of duct 26 depends upon three basic parameters; the volume flow rate of the aerosol stream, particulate number density within said aerosol, and the temperature of the saturated aerosol. As the volume flow rate increases, the pressure drops, and thus the cooling and saturation ratio, increase across a given converging duct. As the aerosol particulate number density increases, the total rate of condensation increases, thereby decreasing the saturation ratio. The higher the temperature of the saturated aerosol, the less cooling is necessary to provide a given saturation ratio. For example, a suitable duct 26 for a 10,000 cfm aerosol stream volume flow rate, saturated at 158° F. would have an inlet 27 cross-section of about 1 m², a throat 28 cross-section of about 0.2 m², and a length of about 3 meters.

Figure 2:
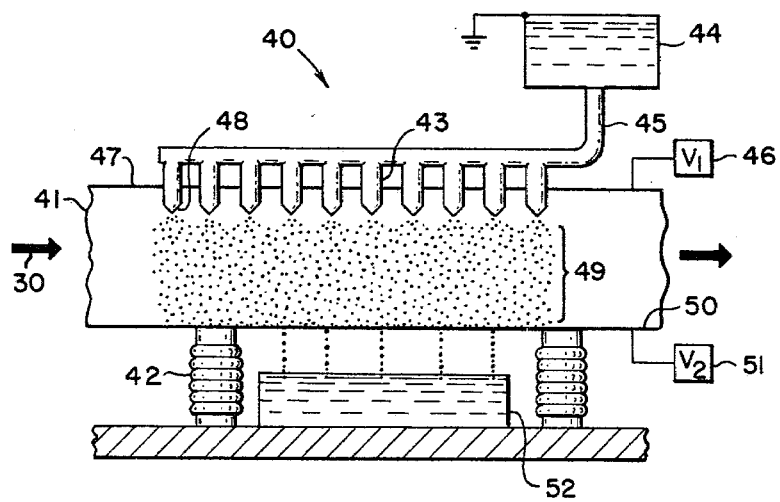
FIG. 2 is a partial, broken-away view of an electrostatic scrubber adapted to remove airborne particles.

Referring to FIG. 2, therein is shown an embodiment of an electrostatic scrubber 40 adapted to receive the supersaturated aerosol stream 30 exiting throat 28 of duct 26 (FIG. 1). Scrubber 40 comprises a scrubbing chamber 41 supported on ground by electrical insulators 42. A plurality of charged-droplet producing nozzles 43 project into and are suitably secured to the top of chamber 41. A supply of scrubbing liquor 44, such as water, is conducted through a conduit 45 to the nozzles 43.

The particulate-containing supersaturated aerosol stream 30 to be scrubbed communicates through throat 28 directly with chamber 41. Nozzles 43 are each formed of an electrical insulating material such as porcelain, plastic, or the like which insulates the liquor 44 from charging electrode 47 through which nozzles 43 pass. Scrubbing liquor 44 is maintained at ground potential and electrode 47 is raised to a high voltage $V_1$ by charging means 46. Charging means 46 imparts a positive potential to electrode 47 if negative charged droplets are desired, and imparts a negative potential to electrode 47 if positive charged droplets are desired.

As taught by Richards, U.S. Pat. No. 4,095,962, the disclosure of which is incorporated by reference herein, the structure of nozzles 43 permits a large, almost uniform, electrical field over the surface of the liquor 44 extending from the tip 48 of nozzle 43. Electric stress acts upon said liquor surface to oppose surface tension stresses acting on said surface, and, if large enough, a droplet 49 is pulled from tip 48 of nozzle 43 and falls into chamber 41.

A collecting electrode 50 is positioned below electrode 47 and the highly-charged droplets 49 are made to drift to electrode 50 by putting a voltage $V_2$ on electrode 50 by any suitable means known to the art, diagramatically represented in FIG. 2 by reference numeral 51. The magnitude of $V_2$ will vary with different applications but should be of the same polarity as $V_1$ and will usually lie between $V_1$ and ten times $V_1$.

In the preferred embodiment of the present invention it is preferred that the highly-charged droplets 49 have a diameter substantially larger than the diameter of the particulates. i.e.—approximately 500 microns. As droplets 49 drift across chamber 41 to collector 50 they are caused to collect the various airborne particulates contained in supersaturated stream 30 and remove said particulates therefrom. Reservoir means 52 are provided for storing the scrubbing liquor 44 collected upon collector 50. Recycling means (not shown) can additionally be provided to filter out the collected particulate from liquor 44.

By way of example to further describe the method of the present invention, it will be assumed that an aerosol stream, having a temperature of about 300° F., has a particulate loading number density of about $10^{12}$ particulates per cubic meter of aerosol. In order to remove the submicron particulates from said aerosol, subsequent inertial impaction of the particles with substantially larger diameter charged droplets, i.e.—having a diameter of approximately 500 microns, is significantly enhanced if said particles are grown to a size of about 1.0 to 5.0 microns. Determining the amount of water necessary to grow said particulates to within the preferred size range may be readily calculated by assuming that each of the particulates has a negligible volume. The maximum amount of water needed for said growth is the volume of a 5.0 micron sphere multiplied by the number or particulates, and then converted to pounds of water. Under the assumed loading of $10^{12}$ particles per cubic meter of aerosol, approximately 0.13 pounds of water are required.

Figure 3:
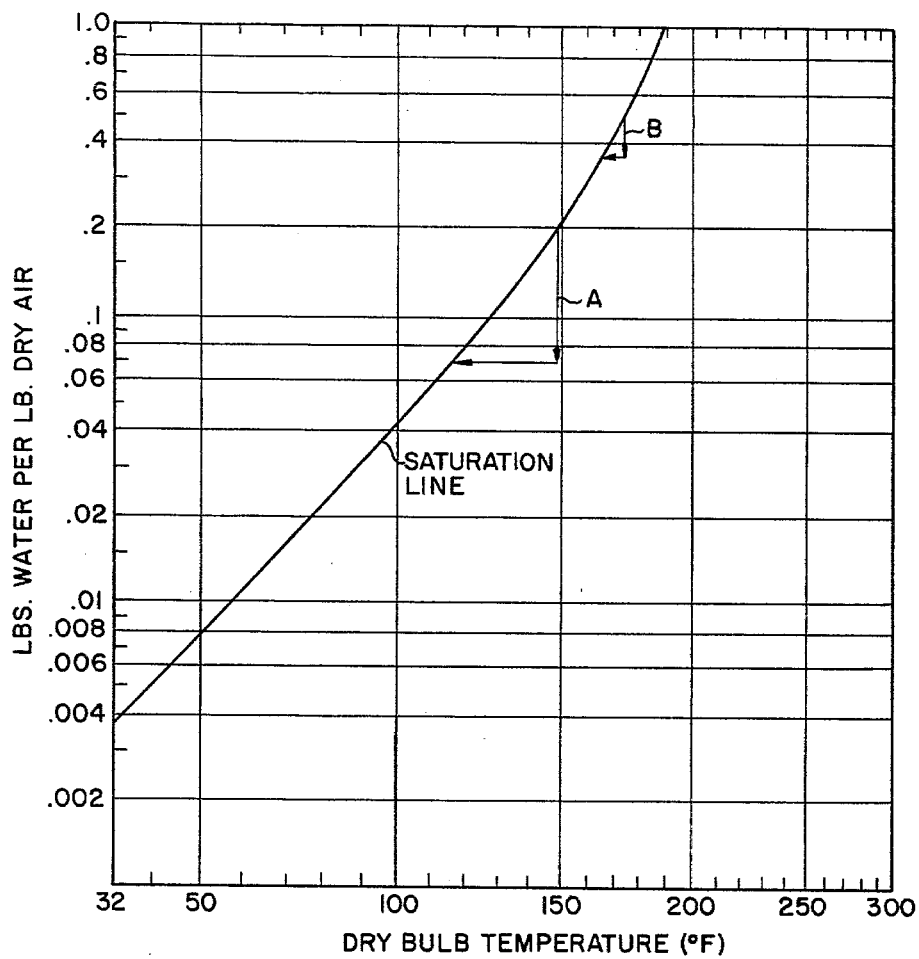
FIG. 3 is a psychometric chart illustrating thereon the advantageous results incident from practicing the method of the present invention.

Reproduced as FIG. 3 is a standard water-in-air psychometric chart which demonstrates that the mixing ratio of water to air, at saturation, is a function of temperature. With respect to reference character A depicted in FIG. 4, it will be noted that a saturated aerosol having a mixing ratio or about 0.2 requires a temperature reduction of approximately 33° F. in order to condense the 0.13 pounds of water necessary for growing the assumed number of particles to 5.0 microns. In contrast, reference character B illustrates that a saturated aerosol at a mixing ratio of about 0.5 requires a reduction of only about 8° F. to condense therefrom the identical amount of water. Therefore, it will be appreciated that certain advantageous results, most notably the reduction of system energy losses, will inure if saturation at elevated temperatures is performed.

If the untreated aerosol stream is initially humidified with hot water alone and allowed a residence time sufficient for equilibrium temperature to become established, some of the water will evaporate into the dry aerosol thereby cooling it. For example, if one pound of water at about 210° F. is sprayed into a pound of dry aerosol stream with a temperature of about 300° F., the resultant admixed stream would be cooled to about 85° F. and have a mixing ratio of about 0.16. For the assumed particulate loading number density, such mixing ratio would require an inordinate amount of cooling to condense the necessary 0.13 pounds of water therefrom. Even if, in the above example, the dry aerosol stream temperature were increased to about 900° F., the resultant admixed stream would have a temperature of about 122° F. and a mixing ratio of about 0.27. Again, an inordinate amount of cooling would be required. In fact, if hot water alone i.e.—at about 210° F., is used to humidify the aerosol, the only way a mixing ratio of about 0.5 at saturation can be achieved, even if the dry aerosol stream temperature is 900° F., is by spraying the dry aerosol stream with about 6 pounds of hot water per pound of dry air.

If, on the other hand, only steam is used to humidify the aerosol stream, 0.5 pounds of steam can be added to each pound of dry air, of virtually any temperature, to produce an unsaturated admixture which can then be cooled to saturation in tower 17.

To ensure that the smaller particles carried by the aerosol continue to grow until they attain a size of about 1.0 to 5.0 microns diameter, the aerosol 30 entering scrubber 41 is preferrably maintained at a supersaturated state of about 1.02 during the particulate scrubbing process. Briefly, said supersaturated state is maintained by sensible heat exchange between charged droplets 49 and the aerosol stream, the volume sweep rate of droplets 49 across chamber 41 towards collector 50 being approximately equal to the volume flow rate of aerosol through chamber 41. For example, a supersaturated aerosol at a temperature of about 150° F. and a volume flow rate of about 1,000 cfm would require a droplet 49 temperature of about 80° F. and a sweep rate of about 4 gal/min to maintain supersaturation conditions.

Based upon the foregoing it will be appreciated that disclosed herein is a new and unique means and method for facilitating particulate growth to a size sufficient for electrostatic scrubbing, said means and method significantly reducing energy losses hitherto associated with the art while concurrently exhibiting increased collection efficiencies thereover. Still further, it will be appreciated that the present invention is readily adaptable for treating certain of the various toxic gas components typically carried by an untreated aerosol and, therefore, an integrated treatment of aerosol streams may be carried out in accordance with the practice of the present invention.

Of course, certain changes, modifications, or rearrangements can be made to the present invention as defined in the appended claims. Therefore, to the extent that such changes, modifications, or rearrangements would be obvious to a person skilled in the art, they are considered to be in the essence and scope of the present invention.

What is claimed is:

1. A method for removing airborne particulates from an aerosol stream, comprising the steps of
   (a) saturating said aerosol stream with water vapor;
   (b) supersaturating said saturated aerosol stream for a time sufficient to permit condensation of said water vapor upon, and growth of said particulates; and
   (c) scrubbing said supersaturated aerosol stream, while maintaining said stream at supersaturation, whereby to remove said particulates therefrom.

2. A method as set forth in claim 1 wherein the step of saturating said aerosol stream comprises the steps of:
   (a) humidifying said aerosol stream with water vapor whereby to obtain an unsaturated aerosol stream having a predetermined mixing ratio; and
   (b) cooling said humidified aerosol stream to saturation temperature.

3. A method as set forth in claim 2 wherein said aerosol stream is humidified by admixing steam therewith.

4. A method as set forth in claim 2 wherein said humidified aerosol stream is cooled to saturation temperature by passing said humidified aerosol stream through a mist of water.

5. A method as set forth in claim 1 wherein the step of supersaturating said saturated aerosol stream comprises adiabatically cooling said saturated aerosol stream by passing said saturated aerosol stream through a converging duct.

6. A method as set forth in claim 1 wherein at least a part of the particulates, prior to said condensation, have a diameter less than about one micron.

7. A method as set forth in claim 1 wherein said supersaturated aerosol is maintained at supersaturation for a time sufficient to grow said airborne particulates to a size of about 1.0 to 5.0 microns diameter.

8. A method as set forth in claim 1 wherein said supersaturated aerosol is maintained at supersaturation for about 0.1 seconds.

9. A method as set forth in claim 1 wherein the step of scrubbing said supersaturated aerosol stream comprises sweeping highly charged droplets of scrubbing liquor across the flow path of said supersaturated aerosol stream whereby to cause said highly charged droplets to collect said particulate from the aerosol stream.

10. A method as set forth in claim 9 wherein said scrubbing liquor is water.

11. A method as set forth in claim 10 wherein said highly charged droplets have a size of about 500 microns diameter.

12. A method as set forth in claim 1, further comprising the step of admixing $NO_x$ and $SO_x$ conditioning particulate with said aerosol stream prior to saturation thereof.

13. An apparatus for removing airborne particulates from an aerosol stream, comprising:
   (a) means for saturating said aerosol stream with water vapor;
   (b) means for supersaturating said saturated aerosol stream for a time sufficient to permit condensation of said water vapor upon, and growth of said particulates; and
   (c) means for scrubbing said supersaturated aerosol stream, while maintaining said stream at supersaturation, whereby to remove said particulates therefrom.

14. An apparatus as set forth in claim 13 wherein said aerosol saturation means comprises:
   (a) means for humidifying said aerosol stream with water vapor whereby to obtain an aerosol stream having a predetermined mixing ratio; and
   (b) means for cooling said humidified aerosol stream to saturation temperature.

15. An apparatus as set forth in claim 14 wherein said means for humidifying said aerosol stream comprises a humidification vessel having aerosol stream inlet means, and outlet means at the opposite ends thereof for removing said aerosol, and means for controllably delivering steam into the interior of said vessel.

16. An apparatus as set forth in claim 14 wherein said means for cooling said humidified aerosol stream comprises a wash tower having inlet means at the base thereof for receiving said humidified aerosol stream and outlet means at the top for removing said saturated aerosol stream, and nozzle means within said tower for saturating said humidified aerosol stream with water vapor.

17. An apparatus as set forth in claim 13 wherein said supersaturation means comprises a converging duct.

18. An apparatus as set forth in claim 13 wherein said scrubbing means comprises highly charged droplets scrubbing means.

* * * * *